(12) United States Patent
Aggarwal et al.

(10) Patent No.: US 10,531,227 B2
(45) Date of Patent: Jan. 7, 2020

(54) TIME-DELIMITED ACTION SUGGESTION SYSTEM

(71) Applicant: Google Inc., Mountain View, CA (US)

(72) Inventors: Vikram Aggarwal, Palo Alto, CA (US); Chen Xiao, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 70 days.

(21) Appl. No.: 15/297,194

(22) Filed: Oct. 19, 2016

(65) Prior Publication Data
US 2018/0109920 A1 Apr. 19, 2018

(51) Int. Cl.
| H04W 4/02 | (2018.01) |
| H04L 12/24 | (2006.01) |
| H04L 12/26 | (2006.01) |
| H04L 29/06 | (2006.01) |
| G06F 16/9535 | (2019.01) |
| H04W 88/02 | (2009.01) |

(52) U.S. Cl.
CPC ........ H04W 4/023 (2013.01); G06F 16/9535 (2019.01); H04L 41/22 (2013.01); H04L 43/16 (2013.01); H04L 69/28 (2013.01); H04W 88/02 (2013.01)

(58) Field of Classification Search
CPC .............................. H04W 4/023; H04L 69/28
See application file for complete search history.

(56) References Cited

U.S. PATENT DOCUMENTS

| 7,657,493 | B2 * | 2/2010 | Meijer | G06F 17/30575 706/12 |
| 8,166,019 | B1 | 4/2012 | Lee et al. | |
| 8,374,894 | B2 * | 2/2013 | Weinstock | G06Q 10/02 705/4 |
| 8,386,929 | B2 | 2/2013 | Zaika et al. | |
| 8,600,981 | B1 * | 12/2013 | Chau | G06F 17/30867 707/723 |
| 8,650,210 | B1 * | 2/2014 | Cheng | G06F 17/30864 707/770 |
| 8,670,979 | B2 | 3/2014 | Gruber et al. | |

(Continued)

OTHER PUBLICATIONS

International Search Report for PCT/US2017/052057 dated Nov. 8, 2017, 13 pages.

(Continued)

Primary Examiner — Parth Patel
(74) Attorney, Agent, or Firm — Middleton Reutlinger

(57) ABSTRACT

Systems and methods for providing time-delimited action suggestions are provided. In one example embodiment, a method includes receiving, by one or more computing devices from a user device, data indicative of a user-requested time-bound activity. The time-bound activity is associated with a time period. The method includes identifying, by the one or more computing devices, one or more parameters associated with a user that requested the time-bound activity. The method includes determining, by the one or more computing devices, a suggested action based at least in part on the one or more parameters associated with the user and the time period associated with the time-bound activity. The method includes providing, by the one or more computing devices, an output indicative of the suggested action to the user device.

20 Claims, 5 Drawing Sheets

(56) References Cited

U.S. PATENT DOCUMENTS

| | | | |
|---|---|---|---|
| 8,849,675 B1* | 9/2014 | Foerster | G10L 15/22 704/251 |
| 8,892,446 B2 | 11/2014 | Cheyer et al. | |
| 8,930,393 B1* | 1/2015 | Nordstrom | G06F 17/3053 707/767 |
| 8,984,626 B2* | 3/2015 | Barton | G06Q 30/0244 726/21 |
| 9,085,303 B2 | 7/2015 | Wolverton et al. | |
| 9,282,425 B2 | 3/2016 | Tomkins et al. | |
| 9,318,108 B2 | 4/2016 | Gruber et al. | |
| 9,562,785 B1* | 2/2017 | Racah | G01C 21/3438 |
| 2003/0167167 A1 | 9/2003 | Gong | |
| 2008/0154608 A1* | 6/2008 | Evermann | G06F 17/30864 704/270.1 |
| 2008/0247519 A1* | 10/2008 | Abella | G10L 15/22 379/88.04 |
| 2009/0150155 A1* | 6/2009 | Endo | G10L 15/04 704/255 |
| 2009/0239552 A1* | 9/2009 | Churchill | G06Q 30/02 455/456.3 |
| 2010/0121636 A1* | 5/2010 | Burke | G06F 3/0346 704/233 |
| 2010/0179753 A1 | 7/2010 | Agarwal et al. | |
| 2010/0271652 A1* | 10/2010 | Sugiyama | G06F 3/1213 358/1.14 |
| 2010/0325127 A1 | 12/2010 | Yassin | |
| 2012/0016678 A1* | 1/2012 | Gruber | G06F 17/3087 704/275 |
| 2012/0084312 A1* | 4/2012 | Jenson | G06F 17/3097 707/767 |
| 2012/0271676 A1 | 10/2012 | Aravamudan et al. | |
| 2013/0066634 A1* | 3/2013 | Soliman | G06F 17/30026 704/270.1 |
| 2013/0179173 A1* | 7/2013 | Lee | G10L 15/22 704/275 |
| 2013/0346450 A1* | 12/2013 | Procopio | G06F 21/6218 707/783 |
| 2014/0019522 A1 | 1/2014 | Weng et al. | |
| 2014/0081633 A1* | 3/2014 | Badaskar | G06F 17/30023 704/235 |
| 2014/0108307 A1 | 4/2014 | Raghunathan et al. | |
| 2014/0129130 A1* | 5/2014 | Kuramura | G01C 21/00 701/400 |
| 2014/0156645 A1* | 6/2014 | Brust | G06F 17/30554 707/722 |
| 2014/0244568 A1* | 8/2014 | Goel | H04W 4/08 706/52 |
| 2014/0280289 A1* | 9/2014 | Marantz | G06F 17/30392 707/767 |
| 2014/0280292 A1* | 9/2014 | Skinder | G06F 17/30448 707/767 |
| 2014/0317698 A1 | 10/2014 | Zafiroglu et al. | |
| 2014/0334645 A1* | 11/2014 | Yun | G10L 15/08 381/110 |
| 2015/0006564 A1* | 1/2015 | Tomkins | G06F 17/30867 707/767 |
| 2015/0045068 A1 | 2/2015 | Soffer et al. | |
| 2015/0095114 A1* | 4/2015 | Hyde | G06Q 10/0639 705/7.38 |
| 2015/0169630 A1* | 6/2015 | Shynar | G06F 17/3087 707/769 |
| 2015/0338852 A1* | 11/2015 | Ramanujam | G01C 21/26 701/2 |
| 2016/0091329 A1 | 3/2016 | Wicker | |
| 2016/0110647 A1* | 4/2016 | Krueger | G06N 5/04 706/11 |
| 2016/0350304 A1* | 12/2016 | Aggarwal | G10L 15/1822 |
| 2017/0010099 A1* | 1/2017 | Simcik | G01S 1/68 |
| 2017/0061561 A1* | 3/2017 | Cha | G06Q 50/30 |
| 2017/0094469 A1* | 3/2017 | Pinard | H04W 4/21 |
| 2017/0104843 A1* | 4/2017 | Cardillo | H04L 69/28 |
| 2017/0176204 A1* | 6/2017 | Jones | B60K 35/00 |
| 2017/0222868 A1* | 8/2017 | Tan | G06Q 30/0633 |
| 2017/0353577 A1* | 12/2017 | Lutz | H04L 43/16 |
| 2018/0020074 A1* | 1/2018 | Ainsworth | H04L 67/2819 |
| 2018/0084081 A1* | 3/2018 | Kuchibhotla | H04L 41/0816 |
| 2018/0234874 A1* | 8/2018 | Beattie | H04W 4/02 |
| 2018/0260485 A1* | 9/2018 | Nakata | G06F 17/30867 |
| 2018/0276701 A1* | 9/2018 | He | G06Q 20/387 |

OTHER PUBLICATIONS

Myers et al., "An Intelligent Personal Assistant for Task and Time Management", AI Magazine, vol. 28, No. 2, 2007, p. 47-61.

* cited by examiner

TIME-DELIMITED ACTION SUGGESTION SYSTEM

FIELD

The present disclosure relates generally to suggesting actions to a user of a user device, and more particularly, to systems and methods for proactively providing time-delimited action suggestions.

BACKGROUND

Often users request actions to be taken by their mobile device, such as to perform a search or provide directions to a particular geographic point-of-interest. The mobile device can process the request and perform a task (e.g., navigation) to meet the user's request. When the task starts, the user is often faced with idle time. During such idle time, the user may become bored, wasting otherwise valuable opportunities to provide assistance to the user. In some cases, the user may actively search on the user's mobile device for certain content to occupy the user's time. However, such active searching can use valuable computing resources as well as potentially distract the user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for providing time-delimited action suggestions. The method includes receiving, by one or more computing devices from a user device, data indicative of a user-requested time-bound activity. The time-bound activity is associated with a time period. The method includes identifying, by the one or more computing devices, one or more parameters associated with a user that requested the time-bound activity. The method includes determining, by the one or more computing devices, a suggested action based at least in part on the one or more parameters associated with the user and the time period associated with the time-bound activity. The method includes providing, by the one or more computing devices, an output indicative of the suggested action to the user device.

Another example aspect of the present disclosure is directed to a system for providing time-delimited action suggestions. The system includes one or more processors and one or more memory devices. The one or more memory devices store instructions that when executed by the one or more processors cause the one or more processors to perform operations. The operations include receiving, from a user device, data indicative of a user-requested time-bound activity. The time-bound activity is associated with a time period. The operations include identifying one or more parameters associated with a user that requested the time-bound activity. The operations include determining a suggested action based at least in part on the parameters associated with the user and the time period associated with the time-bound activity. The suggested action is completable within the time period associated with the time-bound activity. The operations include providing an output indicative of the suggested action to the user device.

Yet another example aspect of the present disclosure is directed to one or more tangible, non-transitory computer-readable media storing computer-readable instructions that when executed by one or more processors cause the one or more processors to perform operations. The operations include receiving data indicative of a user-requested time-bound activity associated with a time period. The operations include identifying one or more parameters associated with a user that requested the time-bound activity. The operations include determining a suggested action based at least in part on the parameters associated with the user and the time period associated with the time-bound activity. The suggested action is completable within the time period associated with the time-bound activity. The operations include providing an output indicative of the suggested action to the user device. The user device is configured to communicate the suggested action to the user.

Other example aspects of the present disclosure are directed to systems, methods, apparatuses, tangible, non-transitory computer-readable media, user interfaces, memory devices, and user devices for providing time-delimited action suggestions.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
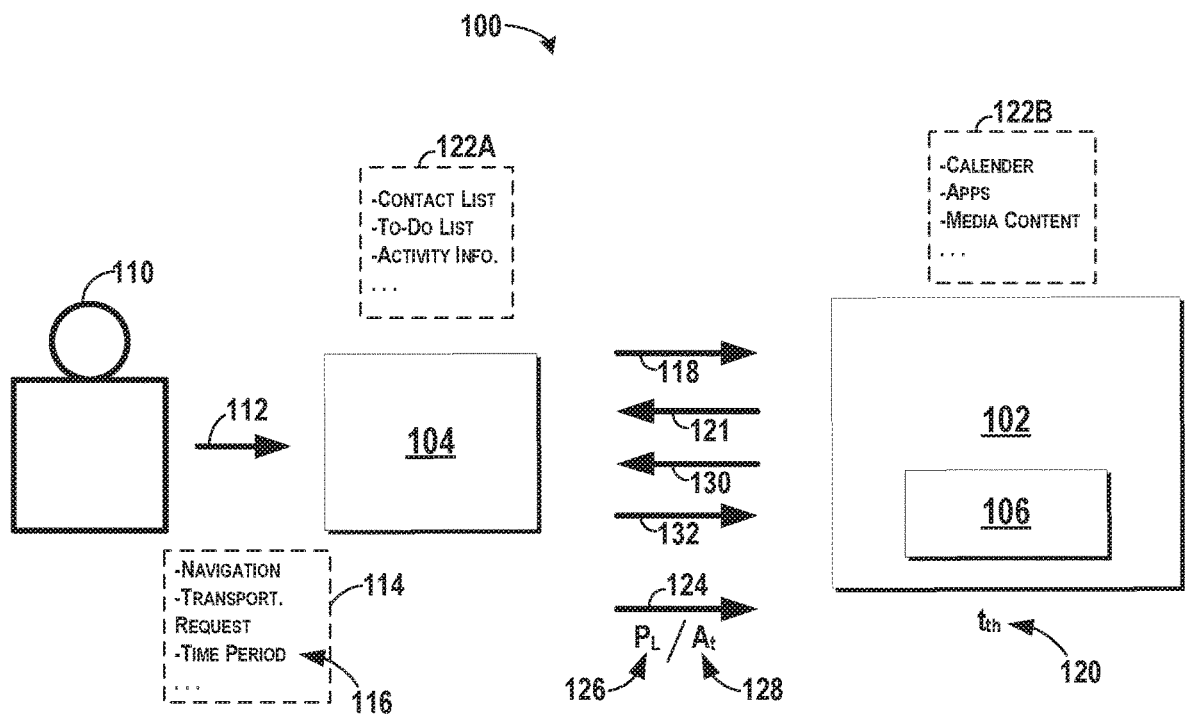
FIG. 1 depicts an example system according to example embodiments of the present disclosure.
Figure 1:
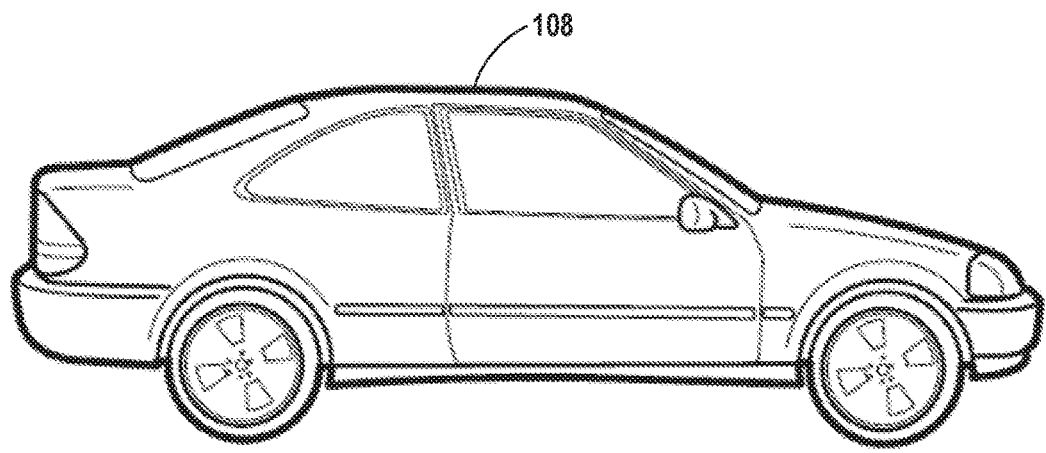

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing time-delimited action suggestions for a user to complete within a given time period while another time constrained activity is performed. A time-bound activity can be, for example, an activity that is associated with a particular time period for completing that activity. For instance, a user can request that its user device (e.g., a mobile phone)

perform a time-bound activity, such as navigating the user to a destination location. The time period associated with the navigation to the destination location can include the time it takes to travel to the destination location. The user device can send data indicative of the navigation activity to a computing system, which can identify one or more parameter(s) associated with the user. Those parameter(s) can include, for example, the software applications downloaded to the user's user device, the user's frequently listened to podcasts, the user's calendar, the user's contacts, etc. The computing system can use one or more of the parameter(s) associated with the user to proactively suggest a specific action for the user that can be completed within the time needed to travel to the destination. For example, in the event that the travel time to the location is forty-five minutes, the computing system can suggest that the user listen to an episode of the user's favorite podcast that is forty-two minutes long—so that the podcast can entertain the user while the user is traveling to the destination location. In this way, the system and methods of the present disclosure can proactively provide suggested actions for a user during otherwise idle time while a user-requested time-bound activity (e.g., navigation) is being completed.

More particularly, a user can request a time-bound activity via a user device. As indicated above, the time-bound activity can be associated with a time period, by which the activity is to be completed. The user device can include a mobile phone, tablet, laptop computer, etc. By way of example, the user can request that the user device navigate the user to a destination location. The time period associated with such navigation can include the time for the user to travel to the destination location. In another example, the user can use her user device to make a transportation request (e.g., via a rideshare software application) to take the user to an airport and the time period can include the estimated time for the requested vehicle to arrive to pick-up the user. The user device can send data indicative of the time-bound activity to a remote computing system according to aspects of the present disclosure.

The computing system can receive the data indicative of the user-requested time-bound activity and compare its associated time period to an initial time threshold. This can allow the computing system to determine whether it is worth suggesting an action for the user during the time period. The initial time threshold be can selected (e.g., by a user, a system administrator, a default setting) such that the computing system will not suggest an action for the user if the time period associated with the time-bound activity is below the threshold. For example, the initial time threshold can be thirty seconds, one minute, two minutes, etc. If the time period associated with the time-bound activity is above the initial time threshold the computing system can suggest an action for the user.

To help determine an appropriate action specifically for the user, the computing system can identify one or more parameter(s) associated with the user. For instance, the computing system can obtain a first set of parameters (e.g., contact lists, to-do lists) from the user device and/or a second set of parameters (e.g., user's calendar, downloaded software applications, downloaded media content, search inquires, email data) from a computing device remote from the user device. In some implementations, the parameters can include a location (e.g., destination, current location of the user), time of day, type of user device, etc. The remote device can include, for example, a cloud-based server system associated with a provider of the user device and/or its operating system.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more way(s) before it is stored or used, so that personally identifiable information is removed. For example, a user's identity may be treated so that no personally identifiable information can be determined for the user. Thus, the user may have control over what information is collected about the user, how that information is used, and what information is provided to the user.

The computing system can determine a suggested action for the user based, at least in part, on the parameter(s) and the time period associated with the time-bound activity. This can allow the computing system to suggest actions that are tailored to the particular user and that can be completed within the time period associated with the user-requested time-bound activity. Moreover, the system can proactively suggest actions for the user, without the user requesting the specific action and/or otherwise requesting suggested actions from the system. In some implementations, the suggested actions can include location specific actions such as suggested stops (e.g., restaurants, shops) along a travel route. A location specific action can be an action that does include (and/or is associated with) a particular location (e.g., for completing the action). In some implementations, the suggested actions can include task specific actions, such as those for entertaining the user and/or those for accomplishing particular user objectives. Moreover, a task specific action can be an action that does not include (and/or is not associated with) a particular location (e.g., for completing the action). The user need not travel to, enter, etc. a particular location to complete a task specific action. By way of example, the computing system can receive data indicative of a navigation activity by which it will take the user forty-five minutes to drive to the destination. The computing system can identify parameters indicative of the media content (e.g., podcasts) typically streamed and/or downloaded by the user. The computing system can proactively suggest that the user listen to a forty-two minute episode of the user's favorite podcast (e.g., Podcast A) during the forty-five minute car ride in order to entertain the user. In another example, the computing system can receive data indicative of a transportation request from the user's current location to an airport. It will take an estimated ten minutes for the requested vehicle to arrive at the user's location to pick-up the user. The computing system can identify parameters associated with the user's calendar indicating that the user has an airline flight later that day and proactively suggest to the user that the user check-in to her flight. This can allow the user to complete the objective of checking-in to her flight. In another example, the computing system can identify parameters associated with the user's to-do list indicating that the user would like to "call the dry cleaners" at some point. The computing system can suggest that the user "call the dry cleaners" while waiting for the car to arrive. In these examples, the suggested action can be completed within the time period associated with the time-bound activity (e.g., navigation, transportation request).

In some implementations, the computing system can determine the suggested action based, at least in part, on a user participation level and/or an activity type associated with the user-requested time-bound activity. The user participation level can be indicative of the amount of interaction (or lack thereof) required by the user during performance of the time-bound activity. This can allow the computing system to make suggestions that are both context aware as well as activity appropriate. For example, the user participation level for the navigation activity can be high given the activity type (e.g., driving along a navigable route). The user participation level for the transportation request activity can be low given the activity type (e.g., waiting for a vehicle). Thus, in the event that the user participation level is high and/or the activity type (e.g., driving) indicates that the user will be more actively engaged, the computing system can suggest an action that may require less active interaction by the user (e.g., listening to a podcast). However, in the event that the user participation level is low and/or the activity type (e.g., waiting for a ride) indicates that the user will be less actively engaged, the computing system can suggest an action that may require more active interaction by the user (e.g., using a user device to check-in to the user's flight, fill-out a passport update application). Additionally, and/or alternatively, the suggested action can be based, at least in part, on the reason the user-requested the time-bound activity. For instance, if the user-requested navigation to Santa Fe, N. Mex., the computing system can suggest that the user listen to a podcast related to Santa Fe.

The computing system can provide an output indicative of the suggested action to the user device. For instance, the computing system can generate an audio output indicative of the suggested action (e.g., "The drive from your location to the destination is forty-five minutes. You have an episode of Podcast A that is forty-two minutes. Do you want to listen to the podcast?"). Additionally, and/or alternatively, the computing system can generate a visual output indicative of the suggested action, such as a user interface and/or a message that is displayable on a user interface via the user device. The user can confirm the suggested action to implement it or deny the suggest action to dismiss it. As will be further described herein, the computing system can use these confirmations and/or denials to track user preferences and/or train its model for determining suggested actions.

Providing time-delimited action suggestions according to example aspects of the present disclosure can improve a user's experience with user devices. More particularly, the systems and methods described herein can proactively provide suggested actions that are specifically tailored to a user. This can allow the user to accomplish more tasks in a time efficient and relevant manner, as well as to be entertained. Moreover, by utilizing data indicative of user-requested time-bound activities, the systems and methods of the present disclosure can ultimately suggest a more appropriate action for the user because the time period of a user-requested activity is more explicit (and likely more accurate) than, for example, relying on a speculated intention of the user (e.g., the geo-intention of the user). These suggested actions can be completed within the time period associated with the user-requested activity, which would likely otherwise be unoccupied by the user. This can increase the likelihood that the user will decide to implement the suggested action. Furthermore, by determining a user participation level and/or an activity type, the systems and methods described herein can help ensure that the suggested action is context aware and activity appropriate.

The systems and methods of the present disclosure provide an improvement to user device computing technology by enabling a user device to leverage the computational resources of the described computing system to proactively suggest user-specific actions to the user. For example, the user device can leverage the computing system to identify one or more parameter(s) associated with a user that requested the time-bound activity, proactively determine a suggested action (e.g., task specific action) based, at least in part, on the one or more parameter(s) associated with the user and the time period associated with the user-requested time-bound activity, and provide an output indicative of the suggested action to the user device. Using the computing system to do this can help save the user device's computational resources (e.g., processing resources, power resources) by reducing the user's need to perform internet searches and/or otherwise search for content during unoccupied times. Moreover, by using the computing system to proactively suggest actions to a user, the systems and methods can help decrease user distraction from the activity (e.g., driving), thus increasing user safety. Further, by comparing the time period associated with the time-bounds activity to the initial time threshold, the computing system can avoid the unnecessary use of computational resources to inappropriately determine suggested actions that would likely be denied by the user.

Additionally, the suggested actions can be created at and delivered by a computing system that is remote from the user device. The computing system can have considerably more resources and data at its disposal to help improve the ability to create suggested actions. For example, the computing system can utilize its computational resources to search millions of documents regarding Santa Fe to create a short summary of the city and/or related recent news. As such, the determination and delivery of suggested actions can be done more effectively and efficiently.

With reference now to the FIGS., example embodiments of the present disclosure will be discussed in further detail. FIG. 1 depicts an example system 100 according to example embodiments of the present disclosure. The system 100 can include a computing system 102 and at least one user device 104. The computing system 102 can be remote from the at least one user device 104. For example, the computing system 102 can be a cloud-based computing system. In some implementations, the computing system 102 can be associated with an operating system, a software application, a provider of the user device, and/or another entity. The computing system 102 and the user device 104 can be interconnected via a direct connection and/or can be coupled via a communications network, such as a LAN, WAN, the Internet, etc., which may be wired and/or wireless, and/or can include any number of wired and/or wireless communication links.

The computing system 102 can include various components for performing various operations and functions as described herein. For instance, the computing system 102 can include one or more computing device(s) 106 (e.g., servers). As will be further described herein, the computing device(s) 106 can include one or more processor(s) and one or more memory device(s). The one or more memory device(s) can include, for example, one or more tangible, non-transitory computer-readable media storing computer-readable instructions that when executed by one or more processor(s) cause the one or more processor(s) to perform operations and functions, for example, such as those described herein for providing time-delimited action suggestions.

The user device 104 can be various types of user devices, such as, a phone, a smart phone, a tablet, a navigation system, a personal digital assistant (PDA), a laptop computer, a desktop computer, a computerized watch (e.g., a smart watch), computerized eyewear, computerized headwear, other types of wearable computing devices, a gaming system, a media player, an e-book reader, a television platform, an embedded computing device, and/or any other type of mobile and/or non-mobile computing device. In some implementations, the user device 104 can be located (temporarily or permanently) in a vehicle 108 (e.g., an automobile). The user device 104 can include various components for performing various operations and functions as described herein. For instance, the user device 104 can include one or more processor(s) and one or more memory device(s).

A user 110 can provide a user input 112 to the user device requesting a time-bound activity 114. As indicated above, the time-bound activity 114 can be associated with a time period 116. The time period 116 can be, for instance, a time by which the activity is to be completed. The time period 116 can be explicit and/or inferred. By way of example, the time-bound activity 114 can include navigation of a user 110 to a destination location and the time period 116 can include a time to travel to the destination location (e.g., via the vehicle 108) as explicitly identified in the navigation process. Additionally, and/or alternatively, if the user is driving her normal commute, the time period 116 can be inferred based, at least in part, on an estimated route, speed, traffic, time of day, etc. In another example, the user 110 can use the user device 104 to make a transportation request (e.g., via a software application) to take the user to a destination location (e.g., an airport) and the time period 116 can include the estimated time for the requested vehicle to arrive to pick-up the user 110.

The user device 104 can receive the user input 112 requesting the time-bound activity 114 from the user. In some implementations, the user device 104 can process the user input 112 to determine information associated with the time-bound activity 114, such as the time period 116, one or more location(s) associated with the time-bound activity 114, etc. For example, in the event that the time-bound activity 114 is a navigation request to a destination location, the user device 104 can determine the time period 116 (e.g., the explicit and/or inferred time to travel to the destination location), the origin location, the destination location, the route, the user's heading, traffic, etc. The user device 104 can send data 118 indicative of the user-requested time-bound activity 114 to the computing device(s) 106 (e.g., of the computing system 102). The data 118 can also, and/or alternatively, be indicative of the information associated with the time-bound activity 114 that is determined by the user device 104.

The computing device(s) 106 can receive (e.g., from the user device 104) the data 118 indicative of the user-requested time-bound activity 114. In some implementations, the computing device(s) 106 can receive data indicative of the time period 116 from the user device 104. The computing device(s) 106 can determine the time period 116 associated with the time-bound activity 114 (e.g., based at least in part on information associated with the time-bound activity).

In some implementations, the computing device(s) 106 can compare the time period 116 associated with the time-bound activity 114 to an initial time threshold 120. The initial threshold 120 be can selected (e.g., by a user, a system administrator, a default setting) such that the computing device(s) 106 will not determine a suggested action for the user 110 if the time period 116 associated with the time-bound activity 114 is below the initial threshold 120. The initial time threshold 120 can be five seconds, ten seconds, thirty seconds, one minute, two minutes, etc. If the time period 116 associated with the time-bound activity is above the initial time threshold 120 the computing device(s) 106 can determine a suggested action for the user 110. If, however, the time period 116 associated with the time-bound activity is below the initial time threshold 120 the computing device(s) 106 may refrain from determining a suggested action for the user 110. Thus, the initial time threshold 120 can be indicative of a minimum time required for a suggested action. This can allow the computing system 102 to determine whether it is worth suggesting an action for the user 110 during the time period 116 and avoid wasting computational resources for time periods that are too short to complete a suggested action.

By way of example, the user-requested time-bound activity 114 can include navigation of the user 110 to a destination location, such as to a neighbor's house. The time period 116 to travel to the neighbor's house can be one minute. The initial time threshold 120 can be two minutes. As such, the computing device(s) 106 can refrain from suggesting an action to the user 110 because the time period until the user 110 arrives at the neighbor's house is lower than the threshold (e.g., not worth filling with a suggested action). If, however, the time period 116 to travel to the neighbor's house is ten minutes (e.g., due to construction), the computing device(s) 106 can determine a suggested action for the user 110 during travel to the neighbor's house. In some implementations, the computing device(s) 106 can provide, to the user device 104, data 121 indicating that the time period 116 exceeds the initial time threshold 120.

To help determine an appropriate action specifically for the user 110, the computing device(s) 106 can identify one or more parameter(s) 122A-B associated with the user 110 that requested the time-bound activity 114. For instance, the computing device(s) 106 can obtain a first set of parameters 122A from the user device 104 and/or a second set of parameters 122B from one or more computing device(s) that are remote from the user device 104 (e.g., one or more of the computing device(s) 106). The first set of parameters 122A can include contact lists, to-do lists, information associated with the time-bound activity 114, and/or other information associated with the user 110 that may be stored and/or accessed by the user device 104. The second set of parameters 122B can include, for instance, a user's calendar, which software applications the user has downloaded, the media content accessed (e.g., downloaded, played, streamed) by the user, user search inquires, email data, and/or other data information associated with the user 110 that may be stored and/or accessed by the computing device(s) 106. In some implementations, to save computational resources, the user device 104 may only provide (and/or the computing device(s) 106 may only obtain) the first set of parameters 122A (and/or the second set of parameter(s) 122B) in the event that the time period 116 exceeds the initial threshold 120. As indicated above, the systems and methods described herein can provide protective settings for user information as well as the ability for user's to control what information is used by the computing system.

The computing device(s) 106 can determine a suggested action based, at least in part, on the parameter(s) 122A-B associated with the user 110 and the time period 116 associated with the time-bound activity 114. The suggested action can be completable within the time period 116 associated with the time-bound activity 114. The computing device(s) 106 can proactively determine the suggested actions in that the user 110 did not request a specific action to be suggested and/or did not request for the computing device(s) 106 to determine and/or provide a suggested action to the user 110. This can help reduce user distraction (e.g., caused by user initiated searching). Moreover, by using parameters associated with the user 110, the computing device(s) 106 can proactively suggest actions that are tailored to the particular user 110 and that can be completed within the time period 116 associated with the user-requested time-bound activity 114. This may increase the chance that the user 110 will accept the suggested action (e.g., as opposed to searching the user device 104 and/or internet for entertainment).

The computing device(s) 106 can determine various numbers and types of suggested actions. The suggested actions can be globally useful, entertaining, and/or specific to the user 110. The computing device(s) 106 can determine one or more suggested action(s) for the user 110 that can be completable within the time period 116. In some implementations, a suggested action can include location specific actions such as suggested stops (e.g., restaurants, shops) along a travel route. A location specific action can be an action that does include (and/or is associated with) a particular location (e.g., for completing the action). In some implementations, a suggested action can include task specific actions, such as those for entertaining the user and/or those for accomplishing particular user objectives. Moreover, a task specific action can be an action that does not include (and/or is not associated with) a particular location (e.g., for completing the action).

By way of example, the computing device(s) 106 can receive data 118 indicative of a navigation activity by which it will take the user 110 forty-five minutes to drive to a destination location. The computing device(s) 106 can identify, among other things, parameter(s) indicative of the media content (e.g., podcasts) typically streamed and/or downloaded by the user 110. The computing device(s) 106 can determine that the user 110 has not yet accessed (e.g., downloaded, streamed) a new episode of the user's favorite podcast (e.g., Podcast A). Moreover, the computing device(s) 106 can determine that the podcast is forty-two minutes in duration and, thus, completeable within the time period 116 of the time-bound activity 116 (e.g., forty-five minutes). As such, the computing device(s) 106 can identify the task of listening to the podcast as a suggested action for the user 110, to occupy the forty-five minute travel time.

In another example, the computing device(s) 106 can receive data 118 indicating that the user 110 is traveling on the user's morning commute. The commute will take an estimated twenty minutes and the user's to-do list indicates that the user 110 would like to "call Jack" at some point. The computing device(s) 106 can proactively identify the task of "calling Jack" as a suggested action that can be completed during the user's morning commute.

In yet another example, the computing device(s) 106 can receive data 118 indicative of a transportation request from the user's current location to an airport. The time period 116 associated with such time-bound activity can be ten minutes because it will take an estimated ten minutes for the requested vehicle to arrive at the user's location to pick-up the user 110. The computing device(s) 106 can identify parameter(s) associated with the user's calendar indicating that the user 110 has an airline flight later that day and proactively determine a suggested action for the user to check into the user's flight. This can allow the user to complete the objective of checking-in to her flight, which typically can take less than ten minutes (e.g., the time period 116). Additionally, and/or alternatively, the computing device(s) 106 can identify parameter(s) associated with the user's to-do list indicating that the user 110 would like to "call the dry cleaners" at some point. The computing device(s) 106 can suggest that the user "call the dry cleaners" while waiting for the requested vehicle to arrive.

In some implementations, the computing device(s) 106 can receive data 124 indicative of at least one of a user participation level 126 associated with the time-bound activity 114 and an activity type 128 associated with the time-bound activity 114. The computing device(s) 106 can determine the suggested action based, at least in part, on at least one of the user participation level 126 and the activity type 128. The computing device(s) 106 can obtain the data 124 indicative of user participation level 126 and/or the activity type 128 from the user device 104 (e.g., which may determine such information) and/or one or more other computing device(s).

The user participation level 126 can be indicative of the amount of interaction (or lack thereof) required by the user 110 during performance of the time-bound activity 114. The activity type 128 can be indicative of the type of activity the user may perform during the time-bound activity 114. For example, the user participation level 126 for the navigation activity can be high given the activity type 128 (e.g., driving along a navigable route). The user participation level 126 for a transportation request activity can be low given the activity type 128 (e.g., waiting for a vehicle). Thus, in the event that the user participation level 126 is high and/or the activity type 128 (e.g., driving) indicates that the user 110 will be more actively engaged, the computing device(s) 106 can determine a suggested action that can require less active interaction by the user 110 (e.g., listening to a podcast). However, in the event that the user participation level 126 is low and/or the activity type 128 (e.g., waiting for a ride) indicates that the user 110 will be less actively engaged, the computing device(s) 106 can determine a suggested action that can require more active interaction by the user 110 (e.g., using a user device 104 to check-in to the user's flight, fill-out a passport update application). In this way, the computing device(s) 106 can determine suggested actions that are both context aware as well as activity appropriate.

Additionally, and/or alternatively, the suggested action can be based, at least in part, on the reason the user-requested the time-bound activity 114 and/or a destination location associated with the time-bound activity 114. For instance, if the user-requested navigation to a baseball stadium, the computing device(s) 106 can suggest that the user listen to a podcast related to the home team of the baseball stadium. In another example, the time-bound activity 114 can be associated with a transportation request to a destination location (e.g., Santa Fe, N. Mex.). The suggested action can be associated with the destination location, such as reading a recent news article related to Santa Fe.

The computing device(s) 106 can generate an output 130 indicative of the suggested action. The computing device(s) 106 can provide the output 130 indicative of the suggested action to the user device 104. The output 130 can include at least one of an audio output indicative of the suggested action and a visual output indicative of the suggested action that is displayable via a user interface on the user device 104. The output 130 can be generated, for example, by parsing the parameter(s) and, in some implementations, identifying a software application associated with the suggested action. In this way, the computing device(s) 106 can proactively provide the suggested actions to the user 110 without the user requesting that the computing device(s) 106 determine and/or provide the suggested actions.

Figure 2:
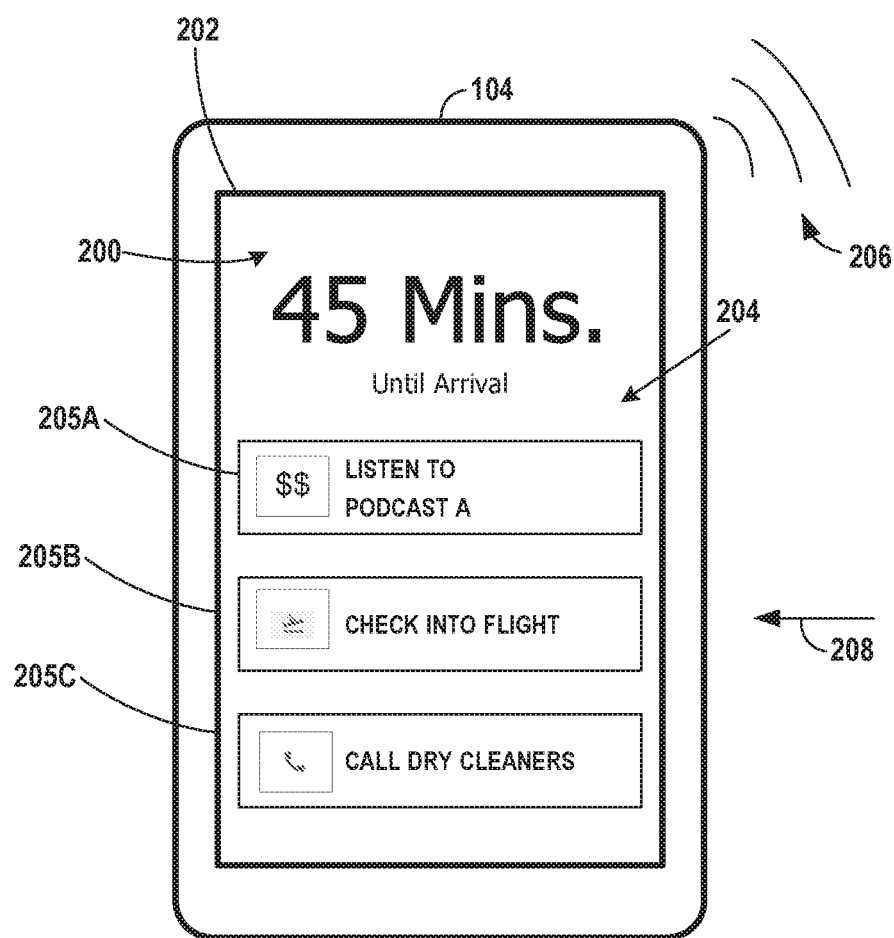
FIG. 2 depicts an example user interface according to example embodiments of the present disclosure.

In some implementations, the output 130 can include a user interface indicative of a suggested action, the user interface being displayable on the user device 104. In some implementations, the output 130 can include a message to be displayed on a user interface via a display device (e.g., of the user device 104). For example, FIG. 2 depicts an example user interface 200 according to example embodiments of the present disclosure. The user interface 200 can be displayed via a display device 202 of the user device 104. The visual output 204 can be indicative one or more suggested action(s) 205A-C and can be displayed via the user interface 200. Additionally, and/or alternatively, the audio output 206 can be indicative of the suggested action (e.g., "The drive from your location to the destination is forty-five minutes. You have an episode of Podcast A that is forty-two minutes. Do you want to listen to the podcast?"). The user device 104 can be configured to communicate the audio output 206 to the user 110 via an audio output component (e.g., speaker).

The user 110 can confirm a suggested action to implement it or deny the suggested action to dismiss it. The user 110 can provide a user input 208 confirming or denying one or more of the suggested action(s) 205A-C. For example, the suggested actions 205A-C can be associated with interactive elements (e.g., widget, soft button, hyperlink) such that a user can implement, start, begin, etc. the suggested action 205A-C by interacting with the interactive element. For example, the user 110 can select the suggested action 205A such that the user device 104 begins to play the podcast for the user 110. In some implementations, the user 110 can confirm one or more of the suggested actions 205A-C via a user input (e.g., voice input) that is indicative of a confirmation of one or more of the suggested action(s) 205A-C (e.g., "yes", "play podcast"). The user 110 can deny one or more of the suggestion action(s) 205A-C by providing a user input (e.g., a swipe touch interaction, selection of a dismiss element) that is indicative of a denial of one or more of the suggested action(s) 205A-C. In some implementations, the user 110 can deny a suggested action 205A-C by refraining from providing any input with respect to the suggested action 205A-C for a certain time period, thereby ignoring the suggestion. After such time period, the user device 104 may remove the visual output 204 from the user interface 200 and/or provide a reminder to the user 110 (e.g., visual, audio).

Figure 3:
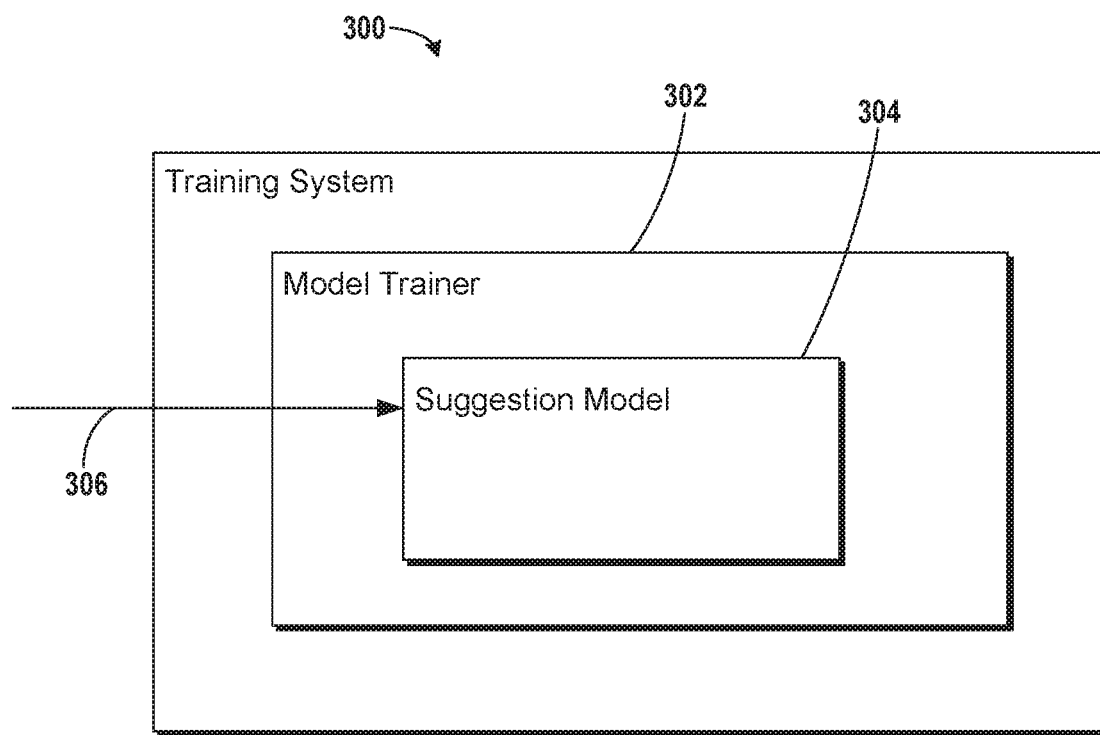
FIG. 3 depicts the training of a machine-learned model according to example embodiments of the present disclosure.

The computing system 102 can use these confirmations and/or denials to train and/or build its model for determining suggested actions. FIG. 3 depicts the training/building of a machine-learned model according to example embodiments of the present disclosure. The computing system 102 can include and/or otherwise be associated with a training computing system 300, which can be implemented locally and/or remotely from the computing device(s) 106. The training system 300 can include a model trainer 302 that trains and/or helps build, for example, a suggestion model 304 (e.g., stored at and/or used by the computing system 102) using various training or learning techniques. The model 304 can be a machine-learned model associated with determining the suggested action. The model 304 can be or can otherwise include various machine-learned models such as neural networks (e.g., deep neural networks) or other multi-layer non-linear models.

The model trainer 302 can train the model 304 based, at least in part, on a set of training data 306. In some implementations, the training data 306 can be provided or otherwise selected by the computing system 102 (e.g., from a database). For instance, the model trainer 302 can train the model 304 using training data 306 indicative of a user's confirmation and/or denials of past suggested actions. The computing device(s) 106 can receive data 132 (e.g., shown in FIG. 1) indicative of a confirmation or a denial of the suggested action 205A-C by the user 110. The computing device(s) 106 can train and/or build the machine-learned model 304 associated with determining the suggested action (e.g., 205A-C) based, at least in part, on the data 132 indicative of the confirmation or the denial. For example, a model 304 can be trained and/or built using training data 304 that is indicative of known suggested actions that have been confirmed and/or denied by the user 110. Additionally, and/or alternatively, the training data 304 could be data that includes information associated with the user 110 and/or the requested time-bound activity 114 that was associated with the suggested action when the user 110 confirmed or denied the suggested action. Such training can help build and/or refine the model 304 to more accurately reflect the specific user's preference for certain suggested actions during certain time-bound activities (and/or other circumstances). In this way, the computing system 102 can better understand the user's preferences and use them (e.g., as parameters) to determine suggested actions (e.g., 205A-C). This can help increase the likelihood that the computing device(s) 106 will determine a suggested action 205A-C that will be implemented by the user 110, thus, avoiding the use of processing resources on undesirable suggested actions.

Figure 4:
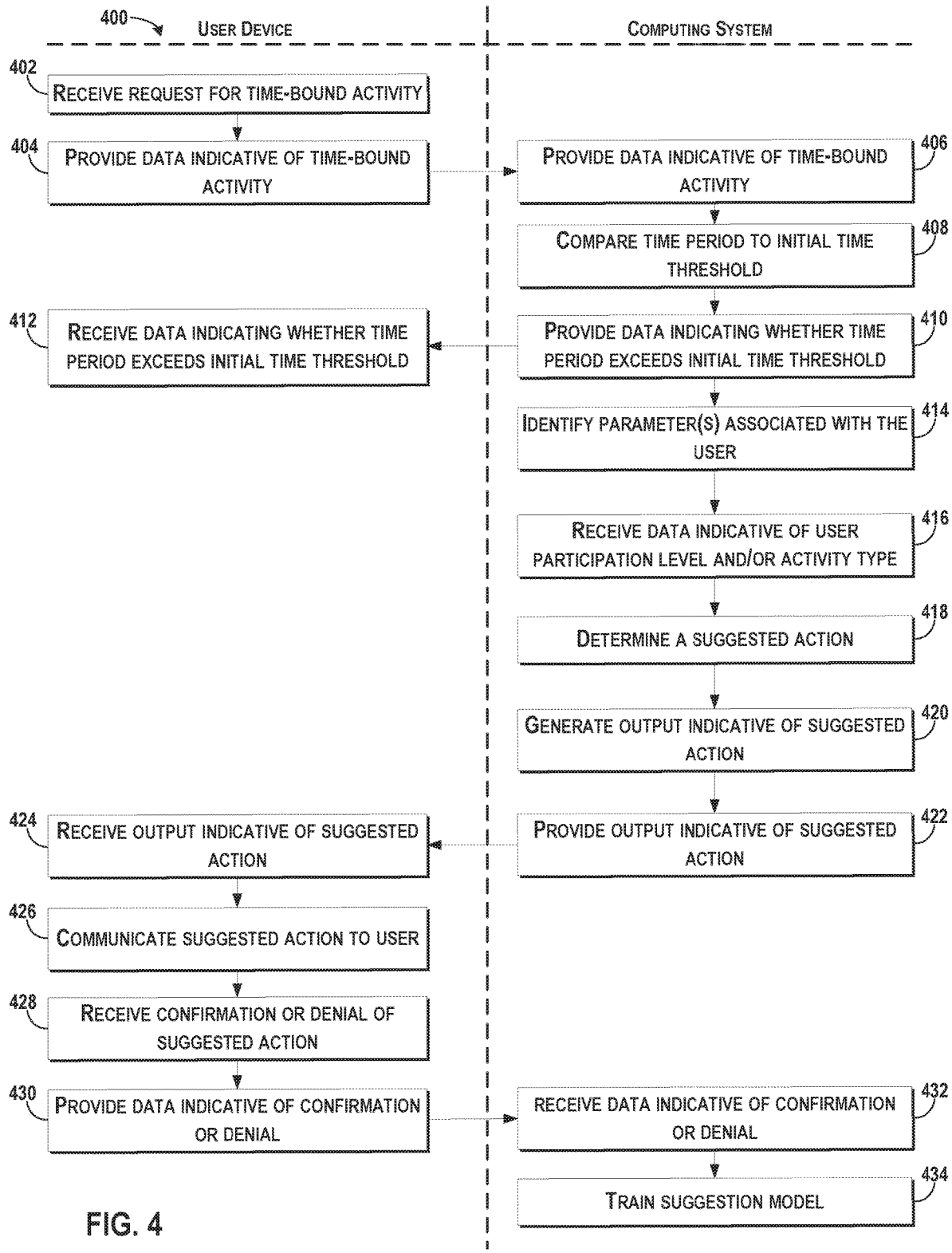
FIG. 4 depicts a flow diagram of an example method according to example embodiments of the present disclosure.

FIG. 4 depicts a flow diagram of an example method of providing time-delimited action suggestions according to example embodiments of the present disclosure. One or more portion(s) of method 400 can be implemented by one or more computing device(s) such as, for example, those shown in FIGS. 1 and 5. Moreover, one or more portion(s) of the method 400 can be implemented as an algorithm on the hardware components of the device(s) described herein (e.g., as in FIG. 5) to, for example, proactively provide time-delimited action suggestions to a user. FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), the method 400 can include receiving a request for a time-bound activity. For instance, the user device 104 can receive a user input 112 that requests the performance of a time-bound activity 114. The time-bound activity 114 can be associated with a time period 116. For example, as described herein, the time-bound activity 114 can include navigation of a user 110 to a destination location and the time period 114 can include a time to travel to the destination location. At (404), the user device 104 can provide data 118 indicative of the time-bound activity 114 to the computing device(s) 106 of the computing system 102. The computing device(s) 106 can receive, from the user device 104, data indicative of a user-requested time-bound activity 116, at (406).

The time period 116 associated with the time-bound activity 114 can be determined in various ways. In some implementations, the user device 104 can determine the time period 116 associated with the time-bound activity 114 by processing information associated with the requested time-bound activity 114 and/or by being provided data indicative of the time period 116 from another computing device. The user device 104 can provide data indicative of the time period 116 (e.g., included in data 118 and/or other data) to the computing device(s) 106. In some implementations, the computing device(s) 106 can determine the time period 116 associated with the time-bound activity 114. To do so, the computing device(s) 106 can process information associated with the time-bound activity 114 (e.g., the time until the requested vehicle picks up the user, the distance between the requested vehicle and the user) and/or receive data indicative of the time period 116 from another computing system (e.g., associated with a transportation service provider system).

At (408), the method 400 can include comparing the time period to an initial time threshold. For instance, the computing device(s) 106 can compare the time period 116 associated with the time-bound activity 114 to an initial time threshold 120 indicative of a minimum time required for the suggested action (e.g., 205A-C). As described above, this can allow the computing device(s) 106 to determine whether it is worth expending the computational resources necessary to determine one or more suggested action(s) 205A-C. In some implementations, at (410), the computing device(s) 106 can provide data 121 that is indicative of whether the time period 116 does or does not exceed the initial time threshold 120. The user device 104 can receive such data, at (412). This can allow, for instance, the user device 104 to determine whether or not to provide parameters associated with the user 110 to the computing device(s) 106. For example, in the event that the time period 116 does not exceed the initial time threshold 120, the user device 104 can refrain from providing parameters (e.g., 122A) associated with the user 110 to the computing device(s) 106. In some implementations, in the event that the time period 116 does exceed the initial time threshold 120, the user device 104 can provide parameters (e.g., 122A) associated with the user 110 to the computing device(s) 106.

At (414), the method 400 can include identifying one or more parameter(s) associated with the user 110. For instance, the computing device(s) 106 can identify one or more parameter(s) 122A-B associated with a user 110 that requested the time-bound activity 114. As described herein, the parameter(s) associated with the user 110 can include a first set of parameters 122A (e.g., contact lists, to-do lists) obtained from the user device 104 and/or a second set of parameters 122B (e.g., user's calendar, downloaded software applications, downloaded media content) obtained from a computing device that is remote from the user device 104. Additionally, and/or alternatively, at (416), the method 400 can include receiving data indicative of a user participation level and/or an activity type. For instance, the computing device(s) 106 can receive data indicative of an activity type 128 (e.g., driving) associated with the time-bound activity 114 (e.g., navigation of a car) and/or can receive data indicative of a user participation level 126 (e.g., high) associated with the time-bound activity 114 (e.g., navigation of a car). The participation level 126 and activity type 128 can be received by the computing device(s) 106 in the same and/or different sets of data.

At (418), the method 400 can include determining a suggested action. For instance, the computing device(s) 106 can (proactively) determine a suggested action 205A-C based, at least in part, on the one or more parameter(s) 122A-B associated with the user 110 and the time period 116 associated with the time-bound activity 114. Different types of parameters 122A-B can be used to determine different types of suggested actions. The suggested action 122A-B can be completable within the time period 116 associated with the time-bound activity 114. As described herein, the suggested action 205A-C can be a task specific action that is not associated with a location for completing the action. For example, the computing device(s) 106 can receive data 118 indicative of a transportation request from the user's current location to a restaurant. The time period 116 associated with such time-bound activity can be ten minutes because it will take an estimated ten minutes for the requested vehicle to arrive at the user's location to pick-up the user 110. The computing device(s) 106 can identify parameter(s) associated with the user's to-do list indicating that the user 110 would like to "call the dry cleaners" at some point. The computing device(s) 106 can suggest that the user "call the dry cleaners" while waiting for the vehicle to arrive. In some implementations, the computing device(s) 106 can (proactively) determine the suggested action (e.g., calling the dry cleaners) based, at least in part, on the user participation level 126, which can be low while the user 110 waits for the requested transportation. Additionally, and/or alternatively, the computing device(s) 106 can determine the suggested action (e.g., making a call) based at least in part on the activity type 128 (e.g., waiting), such that the user's safety and/or needed awareness is not compromised by performing the suggested action. In some implementations, the suggested action(s) can be based, at least in part, on a user's history (e.g., of confirming/denying suggested actions), based on other individuals (e.g. other users/drivers), and/or can be canned suggestions.

At (420) and (422), the method 400 can include generating an output indicative of the suggested action and providing the output. For instance, the computing device(s) 106 can generate an output 130 indicative of one or more suggested action(s) 205A-B. The output 130 can include at least one of an audio output 206 indicative of the suggested action(s) 205A-C and a visual output 204 (e.g., textual message, pictorial message) indicative of the suggested action(s) 205A-C (e.g., "call dry cleaners") that is displayable via a user interface 200 on the user device 104. The computing device(s) 106 can provide the output 130 indicative of the suggested action(s) 205A-C to the user device 104.

At (424), the user device 104 can receive the output 130 indicative of suggested action(s) 205A-C. The user device 104 can be configured to communicate the suggested action(s) 205A-C to the user 110 (e.g., via a display device 202), at (426). The user 110 can view (e.g., the visual output 204), hear (e.g., the audio output 206), and/or feel an indicator of the suggested action (e.g., vibration). The user 110 can confirm and/or deny one or more of the suggested action(s) 205A-C. For example, the user device(s) 104 can receive user input 208 confirming and/or denying one or more of the suggested action(s) 205A-C, at (428).

In the event that the user 110 confirms more than one suggested action, the user device 104 can implement the actions in a particular order and/or concurrently (if possible). For example, the user device 104 can implement the suggested actions 205A-C in the order the suggested actions 205A-C were communicated to the user 110, the order in which the suggested actions 205A-C were confirmed by the user 110, and/or based on the user's preferences (e.g., determined by the model 304), with the most preferable action being implemented first.

At (430) and (432), respectively, the method 400 can include providing and receiving data indicative of the user's confirmation or denial of the suggested action(s) 205A-C. For instance, the user device 104 can provide data 132 indicative of a confirmation and/or a denial of the suggested action(s) 205A-C by the user 110. The computing device(s) 106 can receive, from the user device 1104, the data 132 indicative of a confirmation and/or a denial of the suggested action(s) 205A-C by the user 110. At (434), the computing device(s) 106 can update, build, train, etc. a model 304 associated with determining the suggested action(s) 205A-C based, at least in part, on the data 132 indicative of the confirmation and/or the denial. In this way, the computing system 102 can learn and/or track the preferences of the user 110. The computing system 102 can use the model 304 to determine suggested actions for the user 110 that have a higher likelihood of conforming to the user's preferences, and thus, being confirmed.

Figure 5:
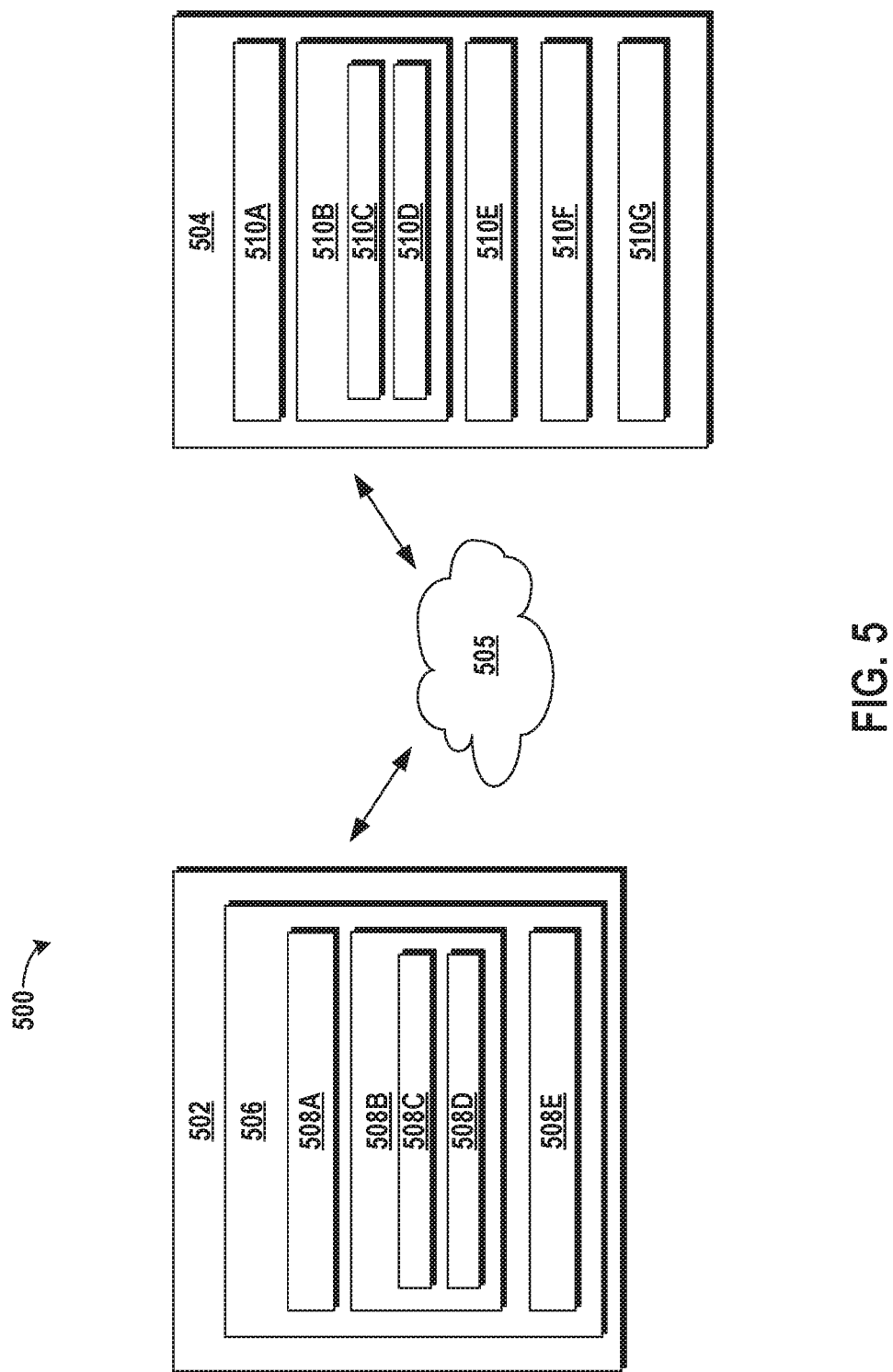
FIG. 5 depicts an example system according to example embodiments of the present disclosure.

FIG. 5 depicts an example system 500 according to example embodiments of the present disclosure. The system 500 can include a computing system 502 and one or more user device(s) 504. The computing system 502 and user device(s) 504 can correspond to the computing system 102 and the at least one user device 104, as described herein. The computing system 502 and the user device(s) 504 can be configured to communicate via one or more network(s) 505.

The computing system 502 can include one or more computing device(s) 506. The computing device(s) 506 can include one or more processor(s) 508A and one or more memory device(s) 508B. The one or more processor(s) 508A can be any suitable processing device (e.g., a processor core, a microprocessor, an ASIC, a FPGA, a controller, a microcontroller, etc.) and can be one processor or a plurality of processors that are operatively connected. The memory device(s) 508B can include one or more non-transitory computer-readable storage media, such as RAM, ROM, EEPROM, EPROM, flash memory devices, magnetic disks, etc., and/or combinations thereof.

The memory device(s) 508B can store information accessible by the one or more processor(s) 508A, including computer-readable instructions 508C that can be executed by the one or more processor(s) 508A. The instructions 508C can be any set of instructions that when executed by the one or more processor(s) 508A, cause the one or more processor(s) 508A to perform operations. In some embodiments, the instructions 508C can be executed by the one or more processor(s) 508A to cause the one or more processor(s) 508A to perform operations, such as any of the operations and functions of the computing device(s) 106 or for which the computing device(s) 106 are configured, as described herein, the operations for providing time-delimited action suggestions (e.g., one or more portions of method 400), and/or any other operations or functions for providing time-delimited action suggestions, as described herein. By way of example, the operations can include receiving data indicative of a user-requested time-bound activity associated with a time period, identifying one or more parameter(s) associated with a user that requested the time-bound activity, determining a suggested action based, at least in part, on the one or more parameter(s) associated with the user and the time period associated with the time-bound activity, wherein the suggested action is completable within the time period associated with the time-bound activity, and providing the output indicative of the suggested action to the user device, wherein the user device is configured to communicate the suggested action to the user. The instructions 508C can be software written in any suitable programming language or can be implemented in hardware. Additionally, and/or alternatively, the instructions 508C can be executed in logically and/or virtually separate threads on processor(s) 508A.

The one or more memory device(s) 508B can also store data 508D that can be retrieved, manipulated, created, or stored by the one or more processor(s) 508A. The data 508D can include, for instance, data indicative of a time-bound activity, its associated time period, an initial time threshold, one or more parameter(s) associated with a user, a user participation level, an activity type, a suggested action, an output, training data, a suggestion model, and/or other data or information. The data 508D can be stored in one or more database(s). The one or more database(s) can be connected to the computing device(s) 506 by a high bandwidth LAN or WAN, or can also be connected to computing device(s) 506 through network(s) 505. The one or more database(s) can be split up so that they are located in multiple locales.

The computing device(s) 506 can also include a network interface 508E used to communicate with one or more other component(s) of the system 500 (e.g., user device(s) 504) over the network(s) 505. The network interface 508E can include any suitable components for interfacing with one or more network(s), including for example, transmitters, receivers, ports, controllers, antennas, or other suitable components.

The user device(s) 504 can be any suitable type of computing device, as described herein. A user device 504 can include one or more processor(s) 510A and one or more memory device(s) 510B. The one or more processor(s) 510A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 510B can include one or more non-transitory computer-readable storage medium(s), such as RAM, ROM, EEPROM, EPROM, flash memory devices, magnetic disks, etc., and/or combinations thereof.

The memory device(s) 510B can include one or more computer-readable media and can store information accessible by the one or more processor(s) 510A, including instructions 510C that can be executed by the one or more processor(s) 510A. For instance, the memory device(s) 510B can store instructions 510C for running one or more software applications, displaying a user interface, receiving user input, processing user input, accessing parameters, etc. as described herein. In some embodiments, the instructions 510C can be executed by the one or more processor(s) 510A to cause the one or more processor(s) 510A to perform operations, such as any of the operations and functions for which the user device(s) 504 are configured, and/or any other operations or functions of the user device(s) 504, as described herein. The instructions 510C can be software written in any suitable programming language or can be implemented in hardware. Additionally, and/or alternatively, the instructions 510C can be executed in logically and/or virtually separate threads on processor(s) 510A.

The one or more memory device(s) 510B can also store data 510D that can be retrieved, manipulated, created, or stored by the one or more processor(s) 510A. The data 510D can include, for instance, data indicative of a user input, data indicative of a time-bound activity, data indicative of a time period, data indicative of parameters associated with the user, etc. In some implementations, the data 510D can be received from another device.

The user device 504 can also include a network interface 510E used to communicate with one or more other component(s) of system 500 (e.g., computing device(s) 506) over the network(s) 505. The network interface 510E can include any suitable components for interfacing with one or more network(s), including for example, transmitters, receivers, ports, controllers, antennas, or other suitable components.

The user device(s) 504 can include one or more input component(s) 510F and/or one or more output component(s) 510G. The input component(s) 510F can include, for example, hardware and/or software for receiving information from a user, such as a touch screen, touch pad, mouse, data entry keys, speakers, a microphone suitable for voice recognition, etc. The output component(s) 510G can include hardware and/or software for audibly producing audio content (e.g., a podcast) for a user. For instance, the audio output component 510G can include one or more speaker(s), earpiece(s), headset(s), handset(s), etc. The output component(s) 510G can include a display device, which can include hardware for displaying a user interface and/or messages for a user. By way of example, the output component 510G can include a display screen, CRT, LCD, plasma screen, touch screen, TV, projector, and/or other suitable display components. In some implementations, the user device 504 may not include a display device.

The network(s) 505 can be any type of communications network, such as a local area network (e.g. intranet), wide area network (e.g. Internet), cellular network, or some combination thereof and can include any number of wired and/or wireless links. The network(s) 505 can also include a direct connection between one or more component(s) of system 500. In general, communication over the network(s) 505 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing time-delimited action suggestions, comprising:
   receiving, by one or more computing devices from a user device, data indicative of a user-requested time-bound activity requested by a user of the user device, wherein the time-bound activity is associated with a time period, and wherein the user-requested time-bound activity is a navigation activity, for the user that requested the time-bound activity, from a first location to a second location and the time period is an anticipated time to travel from the first location to the second location;
   identifying, by the one or more computing devices, one or more parameters associated with the user that requested the time-bound activity, wherein the one or more parameters associated with the user that requested the time-bound activity include at least one of: one or more software applications installed on the user device, and content associated with the one or more software applications installed on the user device;
   determining, by the one or more computing devices, a suggested action based at least in part on the one or more parameters associated with the user and the time period associated with the time-bound activity; and
   providing, by the one or more computing devices, an output indicative of the suggested action to the user device.

2. The computer-implemented method of claim 1, wherein the suggested action is a task specific action that is not associated with a location for completing the action.

3. The computer-implemented method of claim 1, further comprising:
   receiving, by the one or more computing devices, data indicative of a user participation level associated with the time-bound activity; and
   determining, by the one or more computing devices, the suggested action based at least in part on the user participation level.

4. The computer-implemented method of claim 1, further comprising:
   receiving, by the one or more computing devices, data indicative of the navigation activity associated with the time-bound activity; and
   determining, by the one or more computing devices, the suggested action based at least in part on the navigation activity.

5. The computer-implemented method of claim 1, wherein the suggested action is completable within the time period associated with the time-bound activity.

6. The computer-implemented method of claim 1, wherein the output comprises at least one of an audio output indicative of the suggested action and a visual output indicative of the suggested action that is displayable via a user interface on the user device.

7. The computer-implemented method of claim 1, further comprising:
   comparing, by the one or more computing devices, the time period associated with the time-bound activity to an initial time threshold indicative of a minimum time required for the suggested action.

8. The computer-implemented method of claim 1, further comprising:
   receiving, by the one or more computing devices from the user device, data indicative of a confirmation or a denial of the suggested action by the user; and
   updating, by the one or more computing devices, a model associated with determining the suggested action based at least in part on the data indicative of the confirmation or the denial.

9. The computer-implemented method of claim 1, further comprising:
   determining, by the one or more computing devices, the time period associated with the time-bound activity.

10. The computer-implemented method of claim 1, wherein the parameters associated with the user comprise a first set of parameters obtained from the user device and a second set of parameters obtained from a computing device that is remote from the user device.

11. The method of claim 1, wherein the suggested action is performable by one or more of the applications installed on the user device, and is completable within the anticipated time to travel from the first location to the second location.

12. A system for providing time-limited action suggestions, the system comprising:
one or more processors; and
one or more memory devices, the one or more memory devices storing instructions that when executed by the one or more processors cause the one or more processors to perform operations, the operations comprising:
receiving, from a user device, data indicative of a user-requested time-bound activity requested by a user of the user device, wherein the time-bound activity is associated with a time period, and wherein the user-requested time-bound activity is a navigation activity, for the user that requested the time-bound activity, from a first location to a second location and the time period is an anticipated time to travel from the first location to the second location;
identifying one or more parameters associated with the user that requested the time-bound activity, wherein the one or more parameters associated with the user that requested the time-bound activity include at least one of: one or more software applications installed on the user device, and content associated with the one or more software applications installed on the user device;
determining a suggested action based at least in part on the parameters associated with the user and the time period associated with the time-bound activity, wherein the suggested action is completable within the time period associated with the time-bound activity; and
providing an output indicative of the suggested action to the user device.

13. The system of claim 12, wherein the operations further comprise:
receiving data indicative of at least one of a user participation level associated with the time-bound activity and an activity type; and
determining the suggested action based at least in part on at least one of the user participation level and the activity type.

14. The system of claim 12, wherein the output comprises a user interface indicative of the suggested action, the user interface being displayable on the user device.

15. The system of claim 1, wherein the operations further comprise:
comparing the time period associated with the time-bound activity to an initial time threshold indicative of a minimum time required for the suggested action; and
providing, to the user device, data indicating that the time period exceeds the initial time threshold.

16. One or more tangible, non-transitory computer-readable media storing computer-readable instructions that when executed by one or more processors cause the one or more processors to perform operations, the operations comprising:
receiving data indicative of a user-requested time-bound activity requested by a user of a user device, wherein the time-bound activity is associated with a time period, and wherein the user-requested time-bound activity is a navigation activity, for the user that requested the time-bound activity, from a first location to a second location and the time period is an anticipated time to travel from the first location to the second location;
identifying one or more parameters associated with the user that requested the time time-bound activity, wherein the one or more parameters associated with the user that requested the time-bound activity include at least one of: one or more software applications installed on the user device, and content associated with the one or more software applications installed on the user device;
determining a suggested action based at least in part on the parameters associated with the user and the time period associated with the time-bound activity, wherein the suggested action is completable within the time period associated with the time-bound activity; and
providing an output indicative of the suggested action to the user device, wherein the user device is configured to communicate the suggested action to the user.

17. The one or more tangible, non-transitory computer-readable media of claim 16, wherein the operations further comprise:
receiving data indicative of at least one of a user participation level associated with the time-bound activity and an activity type associated with the time-bound activity; and
determining the suggested action based at least in part on at least one of the user participation level and the activity type.

18. The one or more tangible, non-transitory computer-readable media of claim 16, wherein the output comprises at least one of an audio output indicative of the suggested action and a visual output indicative of the suggested action.

19. The one or more tangible, non-transitory computer-readable media of claim 16, wherein the operations further comprise:
receiving data indicative of a confirmation or a denial of the suggested action by the user; and
training a machine-learned model associated with determining the suggested action based at least in part on the data indicative of the confirmation or the denial.

20. The one or more tangible, non-transitory computer-readable media of claim 16, wherein suggested action is associated with the second location.

* * * * *